United States Patent [19]

Rubio

[11] Patent Number: 5,658,463
[45] Date of Patent: Aug. 19, 1997

[54] PROCESS FOR EXTRACTION OF ANALYTES FROM SOLID AND MATERIALS AND FILTRATION

[75] Inventor: Fernando M. Rubio, Doylestown, Pa.

[73] Assignee: Strategic Diagnostics, Inc., Newark, Del.

[21] Appl. No.: 475,965

[22] Filed: Jun. 7, 1995

Related U.S. Application Data

[62] Division of Ser. No. 27,126, Mar. 5, 1993, abandoned.

[51] Int. Cl.$^6$ .................................................. B01D 11/02
[52] U.S. Cl. .................. 210/634; 73/863.23; 210/416.1; 436/178
[58] Field of Search ........................ 210/638, 398, 210/511, 416.1, 416.3, 634, 806; 422/101, 119; 73/863.23; 436/178

[56] References Cited

U.S. PATENT DOCUMENTS

| | | | |
|---|---|---|---|
| 1,531,651 | 3/1925 | Geiger | 241/170 |
| 3,039,938 | 6/1962 | Charm | 195/139 |
| 3,055,208 | 9/1962 | Gallus | 210/416.1 |
| 3,215,500 | 11/1965 | Bittner | 23/259 |
| 3,493,503 | 2/1970 | Mass | 210/59 |
| 3,848,777 | 11/1974 | Sarstedt et al. | 222/386 |
| 3,853,189 | 12/1974 | Cortes et al. | 175/404 |
| 3,859,999 | 1/1975 | Ishikawa | 128/218 |
| 3,872,009 | 3/1975 | Thijssen | 210/178 |
| 3,937,211 | 2/1976 | Merten | 128/2 |
| 4,008,718 | 2/1977 | Pitesky | 128/218 |
| 4,307,808 | 12/1981 | Johnson | 209/614 |
| 4,430,213 | 2/1984 | Ishikawa | 210/136 |
| 4,722,352 | 2/1988 | Sarstedt | 128/765 |
| 4,800,020 | 1/1989 | Savas et al. | 210/359 |
| 4,813,937 | 3/1989 | Vaillancourt | 604/131 |
| 4,832,851 | 5/1989 | Bowers et al. | 210/650 |
| 4,859,336 | 8/1989 | Savas et al. | 210/416.1 |
| 4,897,193 | 1/1990 | Cais et al. | 210/359 |
| 4,973,450 | 11/1990 | Schlüter | 422/101 |
| 4,990,253 | 2/1991 | Vcelka | 210/359 |
| 5,178,779 | 1/1993 | Gironda et al. | 210/800 |
| 5,186,900 | 2/1993 | Jensen et al. | 422/104 |
| 5,358,690 | 10/1994 | Guirguis | 422/58 |
| 5,470,535 | 11/1995 | Ray et al. | 422/101 |

OTHER PUBLICATIONS

"Instructions for Use, Monovette® for Blood Collection," prior to Mar. 5, 1992, published by Sarstedt, Numbrecht, Rommelsdorf, West Germany, p. 2.

"Getting The Most Out of the Environmental Workstation," pp. 2–9. Published by Quantix System, Cinnaminson, NJ in 1992.

Sarstedt, Inc., "Urine Monovette, for hygienic urine analysis," from Sarstedt comprehensive Catalogue 1990/1991, Newton, NC, p. 81.

"Membrane Filtration," from Whatman 1990 Catalog, published by Whatman Labsales, Hillsboro, Oregon, presumably published in 1990, p. 145.

Reference Card for EnviorGard PCB Field, published 1992, 2 pages.

D Tech, "BTEX Soil Extraction PAC Instruction Guide," published by EM Science/Strategic Diagnostics Inc., pp. 1–4.

Rapid Immunoassay Screen "PENTA RISc™ Test System," published by EnSys no later than Jan. 1, 1992, pp. 1–12.

"Portable Analytical Test Kits for EPA Methods," published by Ensys Environmental Products, Inc., in 2 pages.

Quantix, "Portable Workstation User Guide," Published by Quantix System, Cinnaminson, NJ in 1992, Cover page plus pp. 1–32.

Primary Examiner—Joseph W. Drodge
Attorney, Agent, or Firm—Allan H. Fried

[57] ABSTRACT

Kits and processes for detecting analytes present in solid materials, especially soil or foodstuffs. The kits and processes utilize a tubular apparatus, fitted or fittable with a piston, cap and filter, as a scoop and both to extract the analyte from the solid material into the extraction liquid and to separate the extraction liquid from the solid material.

18 Claims, 3 Drawing Sheets

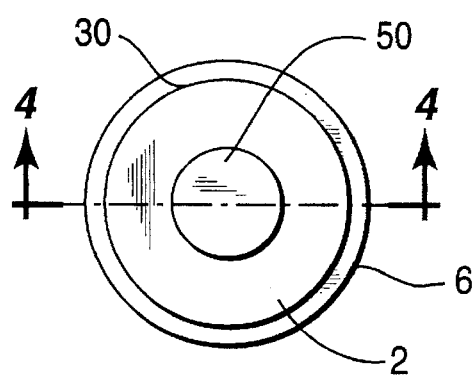
FIG. 1
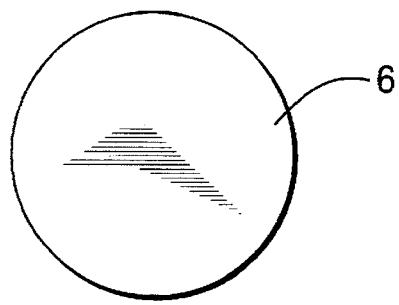
FIG. 2
FIG. 3

PROCESS FOR EXTRACTION OF ANALYTES FROM SOLID AND MATERIALS AND FILTRATION

This application is a divisional application of U.S. application Ser. No. 08/027,126 filed Mar. 5, 1993, abandoned.

FIELD OF THE INVENTION

The inventions are kits and process for extracting analytes from solid materials, especially the extraction of environmental contaminants from soil and foodstuffs.

BACKGROUND

The testing of soil, foodstuffs, and other materials for the presence of environmental contaminants or other analytes involves the collection of large numbers of samples and their subsequent analysis. The present inventions are kits designed to decrease the cost of sample collection and processing (extraction and filtering), and also to make it more convenient to test samples on site or collect them for testing at a distant laboratory.

SUMMARY OF THE INVENTION

The inventions relate to kits and processes for detecting analytes present in solid materials. The solid materials, especially soil or foodstuffs, are placed in or scooped up with a tubular apparatus fitted with a piston, then extraction liquid is added to the solid material, the apparatus is capped and shaken, the cap (if not already fitted with a filter) is replaced with a filter, and pressure is applied (preferably by hand) to the piston so as to force extraction liquid but not solid material through the filter and into a collection device or analytical apparatus.

BRIEF DESCRIPTION OF THE DRAWINGS

FIG. 1. Top plan view of an example of an extraction device.

FIG. 2. Bottom plan view of a device of FIG. 1.

FIG. 3. Side elevational view of the device of FIG. 1.

DETAILED DESCRIPTION

Figure 4:
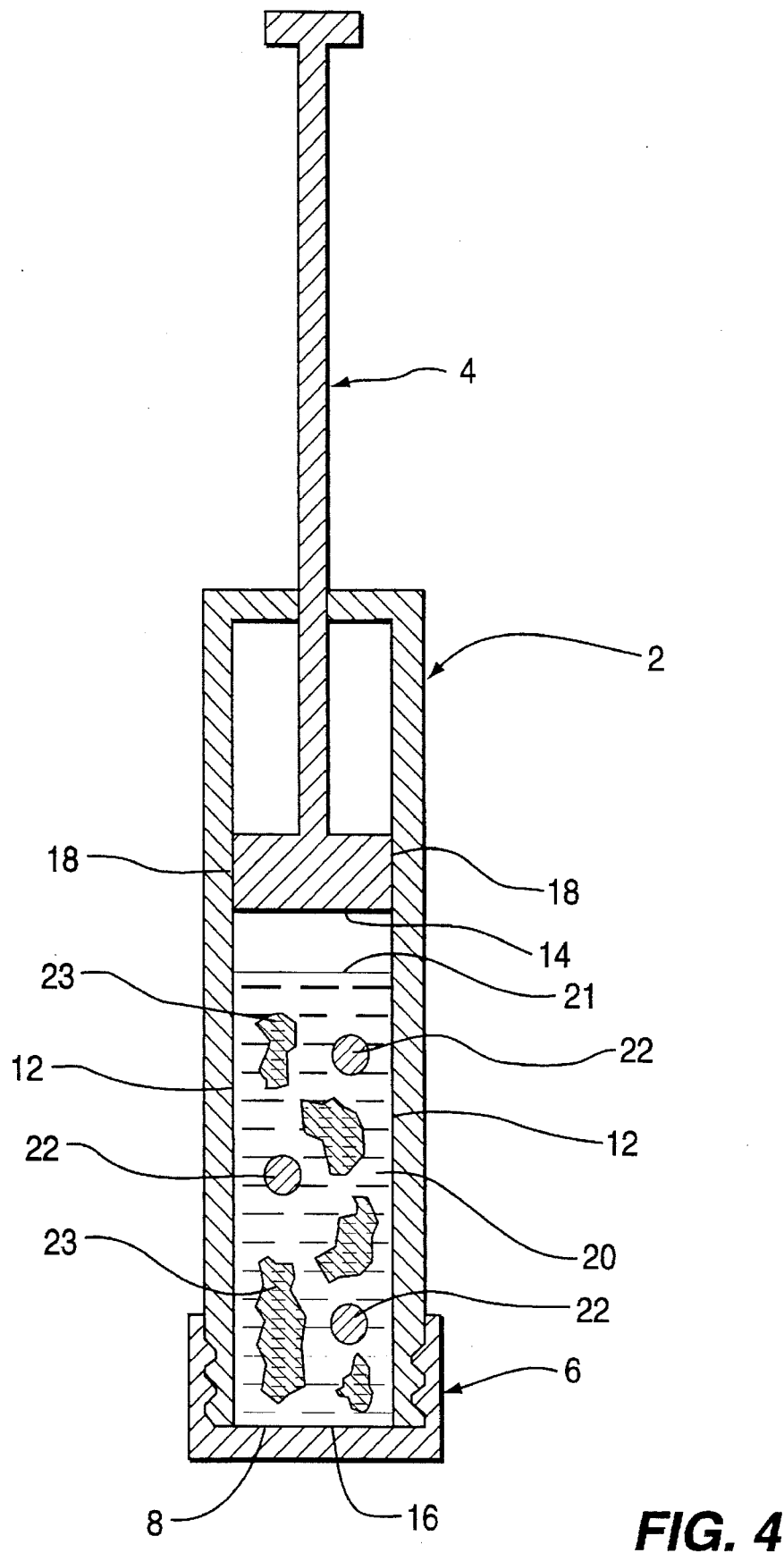
FIG. 4. Cross-sectional view taken along axis 4—4 in FIG. 1.

In one aspect, the invention is a kit for analyzing a sample of solid material for the presence of an analyte, said kit comprising a plurality of extraction devices, each extraction device comprising a tube and a piston, said tube with a front end and a back end, said piston forming a seal with the inner surface of said tube, said piston movable within said tube, a plurality of caps each of which removably and sealingly fits over the end of one of said tubes, and a plurality of filters each of which removably fits over or in the front end of each of said tubes, each filter allowing the through-flow of liquid but not solid material.

A plurality means two or more. It is preferable, however, to have a relatively large number of devices in the kit, for example, 10 or more. In one particular embodiment, there are about 20 devices in the kit.

The kit may have a cap or filter already attached to or in each tube. Alternatively, some or all of the tubes may not be attached to a cap or filter, there being unattached filters and caps in the kit.

In a related aspect, the kit further comprises a plurality of liquid collection receptacles. It may also further comprise an extraction liquid, normally present in a container such as a bottle.

In a related invention, there may be as few as one extraction device, but the kit will have, in addition to the extraction device, a component that makes the kit particularly well-adapted for extracting an analyte from a solid material. That latter component may, for example, be a volume of extraction liquid in a bottle, a statement that the kit can be used to extract an analyte from solid material, or instructions on how to use the kit to extract an analyte from solid material. In such cases, the invention may described as a kit for analyzing a sample of solid material for the presence of an analyte, said kit comprising an extraction device comprising a tube and a piston, said tube with a front end and a back end, said piston forming a seal with the inner surface of said tube, said piston movable within said tube, a cap that removably and sealingly fits over the from end of the tube, a filter that removably fits over or in the front end of said tube, said filter allowing the through-flow of liquid but not solid material, and one or more kit components selected from the group, an extraction liquid, a statement that the kit can be used to extract an analyte from solid material, and instructions for using the kit to extract an analyte from solid material.

Preferably, each extraction device further comprises a means for sealingly engaging a cap.

If the kit has only one type of cap, it is preferred that the cap is a filter cap that removably fits over the front end of one of said tubes, said cap with a channel-that allows liquid but not the filter to pass through it. In an alternative set of embodiments, however, there are two types of caps such that one type is a filter cap as described and one type is a more conventional type (i.e., lacks a channel) whose function is to seal the front end of the device but not function as a filter cap. Additional types of caps for specialized functions may also be added without eliminating the advantages of the invention. Similarly specific reagents for detecting analytes may be added to the kit without losing the advantages of the present invention.

It can be advantageous if the kit further comprises a plurality of disruption elements (e.g., a ball of solid material) each of which fits removably and loosely within each the tube.

The kit may include one or more additional items including, but not limited to, a balance to weigh samples, pipettes, pipettes with a disposable tips, a graduated cylinder.

The kits will preferably also include instructions adapted for the particular solid material (e.g., soil or food stuff) and/or analyte of interest. Preferably all components of the kit will be in a single container, such as a box or carrying case.

Examples of the extraction device and attachments (caps, filters, nozzle covers) that are used with it are shown in FIGS. 1 to 6 and FIG. 8. The Figures show only a few of many types of embodiments that are encompassed in the present invention.

In FIGS. 1 to 6 and FIG. 8, the devices, attachments, and devices with attachments fitted onto them, are each symmetrical around its central axis. A tube (2), a piston (4), a cap (6) and the front end (8) of the tube are denoted. The device has an internal chamber (10) defined by the inner wall (12) of the tube, the front surface (14) of the piston head (47) and the inside surface (16) of the cap. The side surface (18) of the piston head (47) and the inner wall (12) of the tube are in full contact with each other so as to form a seal that prevents the flow of liquid. Nevertheless, the piston head may move relative to the inner wall of the tube.

Inside the device in FIG. 4, an extraction liquid (20), solid material (23), and disruption elements are shown. The liquid, solid material, and disruption elements would be together in the chamber (10) during an analyte extraction process described below. The disruption elements in the figure are balls (22), preferably made of a metal, such as steel. The solid material and the disruption elements are, for illustrative purposes, as suspended in the liquid and in cross section. It is unlikely, of course, that all balls and solid material would, at the same time be symmetrically disposed about the axis of symmetry of the device. Also, frequently, at least some of the balls and solid material will be found resting on the inside surface of the cap when the device is vertically disposed and the cap is at the bottom.

On the outside surface (30) of the tube is a mark (24) (See FIG. 3) which serves to inform the user that, if the front surface (14) of the piston head is aligned at that mark, then the volume of the chamber will have a specified volume. Solid material may be packed into the chamber when the front surface of the piston head is at that mark. Extraction liquid may be added when the piston head has been pulled away from the mark and towards the back (28) of the tube, preferably all the way to the back.

No mark is needed if, for example, the piston rod (48) is short enough so that, when the piston handle (50) is pushed against the back (28) of the tube, the front surface (14) of the piston head does not reach all the way to the front end (8) of the tube. In such a situation, all of the chamber can be used as the defined volume in which to pack in the sample of solid material.

Also visible are a plurality of volume-indicating lines (25) that are spaced at constant intervals along the direction of the main axis of the robe. When the piston head (e.g., the front surface of the piston head) is aligned at one of those lines, then the chamber will have a volume known to the user. The chamber volume corresponding to each line may be marked on the surface of the tube next to each line, or the volume for just some of the some of the lines may be so marked.

In a variation of the Example in the Figures, the front face (14) of the piston head (47) may be recessed within the piston head. In such a case, the side surface (18) of the piston head will still function to make a seal with the inner wall of the tube. In such a case, the shape of the piston head will be like that of the cap (6), except that the piston head will not have threads. This arrangement minimizes the amount of the tube that is occupied by the piston head and maximizes the amount Of chamber volume available for a given tube size.

The tube has a thread (32) that acts as an engagement means to sealingly (i.e., creates a seal) engaging the cap (6). As the cap also has a thread (34) the cap may be screwed onto the device. The tube's thread (32) also acts as an engagement means to engage the filter cap (36) (See FIGS. 5 and 6). Where the thread of the device and the thread of the filter cap engage each other, a seal is formed.

Figure 5:
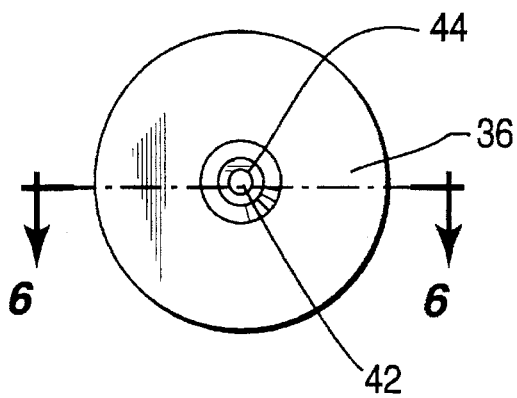
FIG. 5. Bottom plan view of device of FIG. 1 wherein the cap has been replaced with a filter and filter cap.
Figure 6:
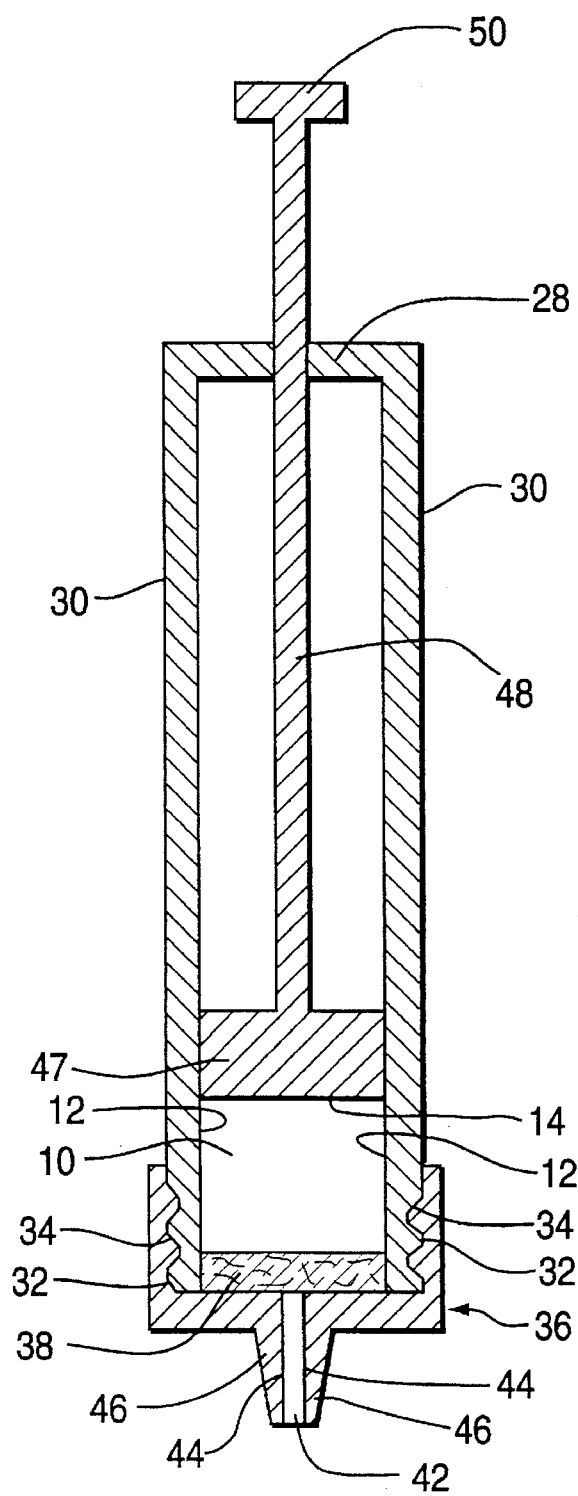
FIG. 6. Cross-sectional view taken along axis 6—6 in FIG. 1.

FIGS. 5 and 6 show the device fitted with a filter (38) and a filter cap (36). The filter is shaped like a disk in this Example. The filter may be attached to the filter cap by an adhesive insoluble in the extraction liquid. The filter cap and the filter may form a single unit if desired. Alternatively, the filter may be a part separate from the filter cap, but one which can be combined with the filter cap as in FIGS. 5 and 6. Another possibility is for the filter to be pushed into the cap and be retained there by the cap threads.

The filter cap has a channel (42) defined by the inner wall (44) of the filter cap nozzle (46). The channel (42) has a diameter that is too small for the filter (38) to pass through it but not too small for the extraction liquid to pass through it. If the piston (4) is moved slowly, the size of the drop will depend primarily on the diameter and shape of the nozzle. One can then use the number of drops as an approximate measure of the volume of extraction liquid.

In the figures, the channel (42) is aligned along the central axis of the device; it may, however, be aligned off-center.

Figure 8:
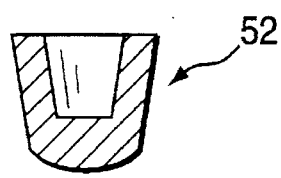
FIG. 8. Cross-sectional view of a filter nozzle cover.

FIG. 8 shows a filter nozzle cover (52) which fits over the filter cap nozzle. When the nozzle cover is placed over the filter cap nozzle, it blocks the channel (42), thereby converting the filter cap (36) into a cap that is functionally equivalent to the cap (6) shown in FIGS. 2, 3 and 4. The use of a plug in the channel (42) achieves the same effect as the nozzle cover in that it blocks the channel (42).

Filters may be made of any of a variety of materials, including glass fiber, nitrocellulose, nylon, polycarbonate, polysulfone, and polyethylene. The pore sizes must be of a size that will allow liquid but not solid material to pass through. Pore sizes in the range 0.2 µm to 20 µm are preferred, 1 µm to 3 µm is especially preferred.

The piston (4) has a piston head (47) fitted with a piston rod (48) that runs along the central axis (the axis of symmetry) of the device. The piston rod is connected to a handle (50). The piston head and the piston rod may be constructed so that the rod is screwed into the piston head and can be removed (e.g., after the addition of solid material but before the addition of extraction liquid) and reinserted (e.g. after the contents of the chamber have been shaken) into the piston head by the user.

When neither the filter cap (36), filter (38), nor cap (6) are attached to the tube (2) then the front end (8) of the tube will be uncovered. When the front end of the tube is uncovered, the tube can be used as a scoop to scoop up solid material for sampling.

The tube (2) is preferably made of a transparent or translucent plastic. The transparency or translucency allows the contents of the chamber and the front surface (14) of the piston head (47) to be seen for accurate alignment. (The transparency or translucency of the tube is disregarded in FIG. 3: none of the internal elements, such as the piston head (47), of the device are visible) A light-weight rigid plastic that does not chemically react with the analyte or the components of the assay used to detect the analyte is preferred. Other components (e.g., caps, pistons, and collection receptacles) may also be made of plastic. Many appropriate plastics are known and in use in medical syringes and the like.

The size of the device will vary depending on the application. Preferred devices are those with chambers between 1 cc and 100 cc of volume. One example of a useful device is a 25 cc monovette manufactured by Sarstedt (Newton, N.C.).

Figure 7:
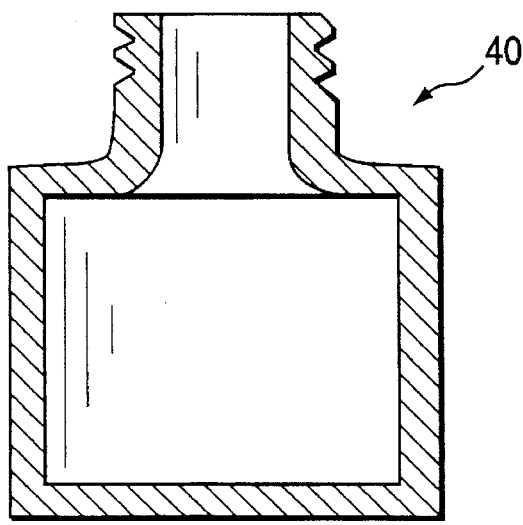
FIG. 7. Cross-sectional view of a collection vial.

An example of a collection vial (40), which can serve as a liquid collection receptacle, is shown in FIG. 7 and is symmetrical about its central axis. In the example, shown in FIG. 7, the vial will fit onto a cap of the same size and shape as the cap (6).

Related to the kit inventions are processes in which the kits are used.

As a result, one of the present inventions is a process of extracting an analyte from a sample of solid material, said process comprising the steps of 1) contacting the solid material with an extraction liquid, and 2) separating the extraction liquid from the solid material by filtration, wherein both steps (1) and (2) are done in a chamber inside the same tubular device, wherein for step (1) said chamber is sealed to prevent leakage of liquid and wherein for step (2) said tubular device comprises a filter at one end and a piston at the other end so that movement of the piston towards the filter will push the extraction liquid but not the solid material through the filter thereby separating the extraction liquid from the solid material.

Preferably, after step (1) but before step (2) an additional step is performed wherein the contents of the chamber are set in motion (e.g. the chamber is shaken back and forth, or otherwise agitated) so as to cause disruption of the solid material in the chamber into smaller pieces, thereby increasing the efficiency at which the analyte is extracted from the solid material. To achieve disruption it can be advantageous, during that additive step, to have disruption elements present in the chamber.

Soil (earth) and foodstuffs are two solid materials for which the processes are well suited.

Soil is a naturally occurring composition (made of inorganic and organic solids, air water, and microorganisms) that can or does support the growth of plants. Examples of soils are those classified as Andisols, Alfisols, Aridisols, Entisols, Histosols, Insceptisols, Mollisols, Oxisols, Spodosols, Ultisols, and Vertisols.

For step (1) one end of the chamber can, for example, be closed by a cap and the other end can, for example, be a piston head. A filter cap in combination with a filter (see FIG. 6) can be used in place of a cap if the filter pores are narrow enough to prevent liquid flow in the absence of piston-caused pressure. Preferably, however, a filter will not be used during step (1) unless the out-flow nozzle of the filter is blocked in some manner (e.g., by a nozzle cap or plug) to prevent liquid from escaping.

Useful situations for the process are in the analysis of solid materials that are soil or foodstuffs. In such a situation, the solid material may be placed in the tubular device or it may be obtained by using the tubular device to scoop up a sample of soil or foodstuff. The tubular device requires that one end (8) be uncovered for it to be used as a scoop (e.g., the end will be uncovered if one removes the filter cap (36) and filter (38) from the device shown in FIG. 6 or removes the cap (36) from the device shown in FIG. 4).

Foodstuffs that may be analyzed include, grain and grain products, dairy products, fruits, and vegetables. Grains and grain products include but are not limited to barley, corn, popcorn, oats, rice, soybeans, wheat, milled corn products, and wheat flour. Dairy products include, but are not limited to, cheese and cheese products. Fruits include, but are not limited to, bananas, strawberries, peaches, apricots, plums, melons, watermelons, cantaloupes, pineapples, and grapes. Vegetables include, but are not limited to, corn, beans, peas, tomatoes, mushrooms, potatoes, and beets.

The kits and processes of this invention are applicable to the detection of any analyte that is soluble in either an aqueous or organic solvent.

An analyte is a substance that an assay or test is designed to detect. Analytes of interest include environmental contaminants such as herbicides, insecticides, fungicides, and other pesticides, and metals. Environmental contaminants of interest include, but are not limited to, polychlorinated biphenyls, aromatic volatiles, polyaromatic hydrocarbons, phthalate esters, surfactants, nitroaromatics, chlorinated benzenes, phenols, and organic acids, dioxins, heavy metals, petroleum hydrocarbons, mutagenic compounds from chlorination, and toxins.

For example, environmental contaminants of interest include 2-chloro-2',6'-diethyl-N-methoxymethylacetanilide (Alachlor), 2-methyl-2-(methylthio)propionaldehyde O-methylcarbamoyloxime (Aldicarb), 2-(4-chloro-6-ethylamino-1,3,5-triazin-2-ylamino)-2-methylpropionitrile (Cyanazine), (2,4-dichlorophenoxy)acetic acid (2,4-D), methyl 1-(butylcarbamoyl)benzimidazol-2-ylcarbamate (Benomyl), methyl benzimidazol-2-ylcarbamate (Carbendazim), 1,2,3,6-tetrahydro-N-(trichloromethylthio) phthalimide (Captan), 2,3-dihydro-2,2-dimethylbenzofuran-7-yl methylcarbamate (Carbofuran), 2-chloro-6'-ethyl-N-(2-methoxy-1-methylethyl)acet-o-toluidide (Metolachlor), and N-(3,5-dichlorophenyl)-1,2-dimethylcyclopropane-1,2-dicarboximide (Procymidone).

Examples of polychlorinated biphenyls (PCBs) are PCB-1016 (Aroclor 1016), PCB-1221 (Aroclor-1221), PCB-1232 (Aroclor-1232), PCB-1242 (Aroclor-1242), PCB-1248 (Aroclor-1248), PCB-1254 (Aroclor-1254), and PCB-1260 (Aroclor-1260).

Examples of aromatic volatiles (BTEX) are benzene, chlorobenzene, 1,2-dichlorobenzene, 1,3-dichlorobenzene, 1,4-dichlorobenzene, ethyl benzene, toluene, and xylenes (dimethyl benzenes).

Examples of polyaromatic hydrocarbons are acenaphthene, acenaphthylene, anthracene, benzo(a) anthracene, benzo(a)pyrene, benzo(b)fluoranthene, benzo(j) fluoranthene, benzo(k)fluoranthene, benzo(g,h,i)perylene, chrysene, dibenz(a,h)acridine, dibenz(a,j)acridine, dibenz(a, h)anthracene (dibenzo(a,h)anthracene), 7H-dibenzo(c,g) carbazole, dibenzo(a,c)pyrene, dibenzo(a,h)pyrene, dibenzo (a,i)pyrene, fluoranthene, fluorene, indeno(1,2,3-cd)pyrene, 3-methylcholanthrene, naphthalene, phenanthrene, and pyrene.

Examples of phthalate esters are benzylbutyl phthalate, bis(2-ethylhexyl)phthalate, diethylphthalate, di-n-butyl phthalate, dimethyl phthalate, and di-n-octyl phthalate.

Examples of anionic surfactants are alkyl benzene sulfonates (ABS), linear alkyl benzene sulfonates, and other sulfonates, sulfate esters and sulfated nonions.

Examples of nonionic surfactants are linear primary alcohols, branched octyl alcohols, branched nonylphenols, alkyl polyethers, and alkylphenols.

Examples of nitroaromatics are dinitrobenzene, 2,4-dinitrotoluene, 2,6-dinitrotoluene, isophorone, 2,4,6-trinitrotoluene, 2,4-dinitrophenol, 2,4-dinitroaniline, nitrobenzene, and naphthoquinone.

An example of a chlorinated benzene is hexachlorobenzene.

Examples of phenols and organic acids are benzoic acid, benzyl alcohol, 2-secbutyl-4,6-dinitrophenol (DNBP), 4-chloro-3-methylphenol, 2-chlorophenol, cresol (methyl phenols), 2-cyclohexy-4,6-dinitrophenol, 2,4-dichlorophenol, 2,6-dichlorophenol, 2,4-dimethylphenol, 4,6-dinitro-o-cresol, 2,4-dinitrophenol, 2-methyl-4,6-dinitrophenol, 2-nitrophenol, 4-nitrophenol, pentachlorophenol, phenol, tetrachlorophenols, and trichlorophenols.

Examples or dioxins are polychlorinated dibenzodioxins (PCDDs) and dibenzofurans (PCDFs).

Examples of heavy metals are cadmium, lead, and mercury.

Examples of petroleum hydrocarbons are gasoline range organics (similar to BTEX, aromatic), jet fuel, kerosene, diesel, and total petroleum hydrocarbons.

Examples of mutagenic compounds from chlorination are 3-chlor-4-(dichloromethyl)-5-hydroxy-2(5H)-furanone, and E-(2)-chloro-3-dichloromethyl-4-oxobutenoic acid.

The choice of extraction liquid will depend on which analyte or analytes are to be tested for. In addition to purely aqueous solvents (e.g., water or water with a pH buffer added), useful solvents include organic-water mixtures (e.g., methanol: water in a 75:25 ratio; methanol/NaOH; methanol/acetic acid) and pure organic solvents including, but not limited to, ethanol, propanol, acetone, acetonitrile, and dimethyl sulfoxide. Where required for efficient extraction, the pH may be adjusted.

In one version of the process, in step (2) the separation of the extraction liquid from the solid material by filtration involves the counting of the drops of extraction liquid collected as a measure of the volume of extraction liquid collected.

In another version of the process, the tubular device has a plurality of volume-indicating lines spaced at constant intervals in the direction of the main axis of the robe and in step (2) the separation of the extraction liquid from the solid material by filtration involves the dispensation of a specific volume of extraction liquid via the filter by starting the dispensation with the piston head aligned at one of said lines and stopping the dispensation with the piston head aligned at a another of said lines.

The extraction liquid, upon flowing out of the filter, may be collected in a liquid collection receptacle or allowed to flow directly into a chromatographic or other analytical device. After the extraction liquid has been separated from the solid material by filtration and collected, it will be analyzed for the environmental contaminant or contaminants of interest.

The method used to detect the analyte of interest will depend on which analyte it is as well as other factors. Analytes can generally be detected by chromatographic methods, such as gas chromatography, high pressure liquid chromatography (HPLC), and thin layer chromatography. They may also, in some cases, be detected immunochemically and by electrochemical biosensor devices.

A typical set of instructions for a kit could therefore include the following:

1. With the front end of the sampling device uncovered, move the piston head surface to the mark MM so as to create a scoop.

2. With the piston head front surface still at the mark, scoop up soil to fill the scoop.

3. Move the piston head front surface back to the mark as far back as possible.

4. Allow the soil sample to settle down (towards the front surface of the piston head) in the tube.

5. Add 20 ml of extraction liquid to tube. Screw on the cap.

6. Add steel balls to tube.

7. Shake the tube for 2 minutes so as to disrupt the soil.

8. Replace the cap with the filter cap containing a filter.

9. Open a collection vial.

10. Push the piston head forward until the desired mount of extraction liquid has moved through the filter and been collected in the collection vial.

Similar instructions could be used for foodstuffs or other material by replacing the word soil with the name of the appropriate foodstuff or other material. The volume of extraction liquid added to the tube can be almost any volume, providing there is sufficient room for it in the chamber, and providing it is not so small that it is totally absorbed by the solid material. The time that the tube is shaken can be as short or long as desired. The time of shaking will depend on how long it takes the solid material to be dispersed into small pieces that can be efficiently extracted and how long each of those pieces needs to be shaken for efficient extraction to take place.

What is claimed is:

1. A process of extracting an analyte from a sample of solid material, said process comprising the steps of:
    1) scooping solid material into, the open end of a tubular device using the tubular device as a scoop, said tubular device being fitted with a piston,
    2) contacting the solid material with an extraction liquid, and
    3) separating the extraction liquid from the solid material by filtration, wherein steps (1), (2), and (3), are done in a chamber inside the same tubular device, wherein for step (2) said chamber is sealed to prevent leakage of liquid and wherein for step (3) said tubular device comprises a filter at one end and a piston at the other end so that movement of the piston towards the filter will push the liquid but not the solid material through the filter thereby separating the liquid from the solid material.

2. A process of claim 1 wherein after step (2) but before step (3) an additional step is performed wherein the contents of the chamber are set in motion so as to cause disruption of the solid material in the chamber into smaller pieces.

3. A process of claim 2 wherein the solid material is soil.

4. A process of claim 2 wherein the solid material is a foodstuff.

5. A process of claim 2 wherein in step (3) the separation of the extraction liquid from the solid material by filtration involves the counting of the drops of extraction liquid collected as a measure of the volume of extraction liquid collected.

6. A process of claim 5 wherein the solid material is soil.

7. A process of claim 5 wherein the solid material is a foodstuff.

8. A process of claim 2 wherein the tubular device further comprises a volume-indicating line and the piston comprises a piston head and in step (3) the separation of the extraction liquid from the solid material by filtration involves the dispensation of a specific volume of extraction liquid via the filter by starting or stopping the dispensation with the piston head aligned at one of said lines.

9. A process of claim 8 wherein the solid material is soil.

10. A process of claim 8 wherein the solid material is a foodstuff.

11. A process of claim 8 wherein the tubular device has a plurality of volume-indicating lines spaced at constant intervals in the direction of the main axis of the tube and in step (3) the separation of the extraction liquid from the solid material by filtration involves the dispensation of a specific volume of extraction liquid via the filter by starting the dispensation with the piston head aligned at one of said lines and stopping the dispensation with the piston head aligned at a another of said lines.

12. A process of claim 11 wherein the solid material is soil.

13. A process of claim 11 wherein the solid material is a foodstuff.

14. A process of claim 1 wherein during step (2), disruption elements are present in the chamber.

15. A process of claim 14 wherein the solid material is soil.

16. A process of claim 14 wherein the solid material is a foodstuff.

17. A process of claim 1 wherein the solid material is soil.

18. A process of claim 1 wherein the solid material is a foodstuff.

* * * * *

UNITED STATES PATENT AND TRADEMARK OFFICE
CERTIFICATE OF CORRECTION

PATENT NO. : 5,658,463
DATED : August 19, 1997
INVENTOR(S) : Fernando M. Rubio

It is certified that error appears in the above-identified patent and that said Letters Patent is hereby corrected as shown below:

Title page, item [54] and col. 1, line 2,
IN THE TITLE

After the word "ANALYTES", please delete the word "AND"

Column 2, line 27, after the word "the", delete "from" and insert therefor --front--.

In Claim 1 at column 8, line 19, please delete the comma after the word "into".

Signed and Sealed this

Twentieth Day of October, 1998

*Attest:*

BRUCE LEHMAN

*Attesting Officer*    *Commissioner of Patents and Trademarks*